United States Patent [19]

van der Vleugel et al.

[11] Patent Number: 4,687,878

[45] Date of Patent: Aug. 18, 1987

[54] SEPARATION OF HYDROCARBONS USING MAGNETIZABLE ADSORBENTS

[75] Inventors: Dominicus J. M. van der Vleugel, Rosmalen; Klaas Hoving, Hellevoetsluis, both of Netherlands; Theodorus M. Wortel, Houston; Ronald E. Rosensweig, Summit, both of Tex.; Lovat V. C. Rees, Chiselhurst, United Kingdom

[73] Assignee: Exxon Research & Engineering Co., Florham Park, N.J.

[21] Appl. No.: 860,564

[22] Filed: May 7, 1986

Related U.S. Application Data

[62] Division of Ser. No. 623,728, Jun. 22, 1984, Pat. No. 4,617,282.

[30] Foreign Application Priority Data

Jun. 24, 1983 [GB] United Kingdom ............... 8317228

[51] Int. Cl.$^4$ ............................................. C07C 7/13
[52] U.S. Cl. ............................. 585/820; 208/310 Z; 585/805; 585/828
[58] Field of Search ................... 585/820, 805, 828; 208/310 Z

[56] References Cited

U.S. PATENT DOCUMENTS

| | | | |
|---|---|---|---|
| 3,130,007 | 4/1964 | Preck | 49/68 |
| 3,730,910 | 7/1973 | Albers et al. | 252/455 |
| 4,115,927 | 9/1978 | Rosensweig | 34/1 |
| 4,175,059 | 11/1979 | Edwards et al. | 502/65 |
| 4,178,352 | 12/1979 | Vaughan et al. | 423/329 |
| 4,247,987 | 2/1981 | Coulaloglon et al. | 423/DIG. 16 |
| 4,252,679 | 2/1981 | Mertzweillen et al. | 502/111 |
| 4,255,289 | 3/1981 | Balinsky et al. | 502/327 |
| 4,289,655 | 9/1981 | Bailey | 502/327 |
| 4,319,892 | 3/1982 | Waghorne et al. | 55/60 |
| 4,319,893 | 3/1982 | Hatch et al. | 55/60 |
| 4,347,164 | 8/1982 | Scherzer | 502/74 |
| 4,368,347 | 1/1983 | Carra et al. | 585/828 |
| 4,443,231 | 4/1984 | Siegell | 55/3 |
| 4,565,793 | 1/1986 | Rosensweig | 502/74 |
| 4,617,282 | 10/1986 | van der Vleugel et al. | 502/66 |

FOREIGN PATENT DOCUMENTS

1245349 9/1971 United Kingdom .
1597617 9/1981 United Kingdom ................... 55/60

OTHER PUBLICATIONS

Maskos et al., J. Catalysis, vol. 66, 73–81 (1980).
Tungler et al., Acad. Phys. Chem. 1978, 24 (1–2), 319–325.

*Primary Examiner*—Asok Pal
*Attorney, Agent, or Firm*—R. F. Northover; D. E. Furman

[57] ABSTRACT

Magnetizable adsorbent particles suitable for use in a magnetically stabilized fluidized bed and with a smaller particle size than conventionally formed composite adsorbents are prepared by introducing magnetizable particles such as magnetite or iron into a reaction mixture for forming a zeolite having adsorbent properties, such as zeolite Y. The zeolite is formed as a coating on the magnetizable particle.

12 Claims, 2 Drawing Figures

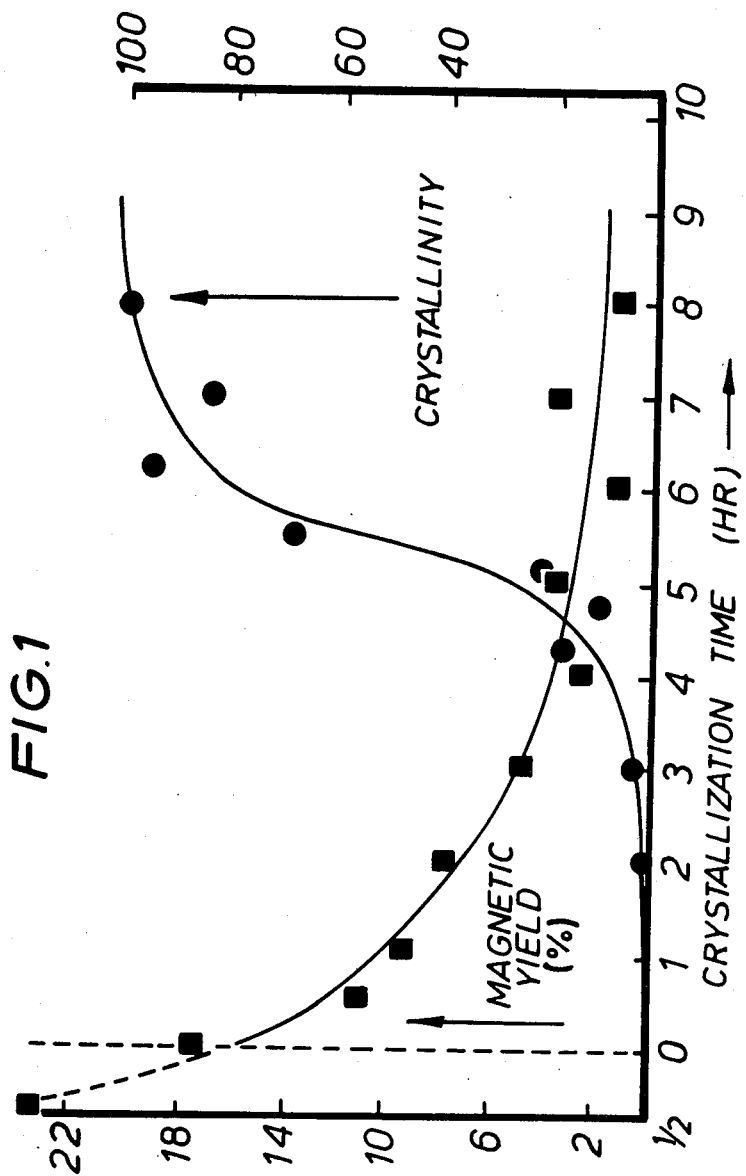

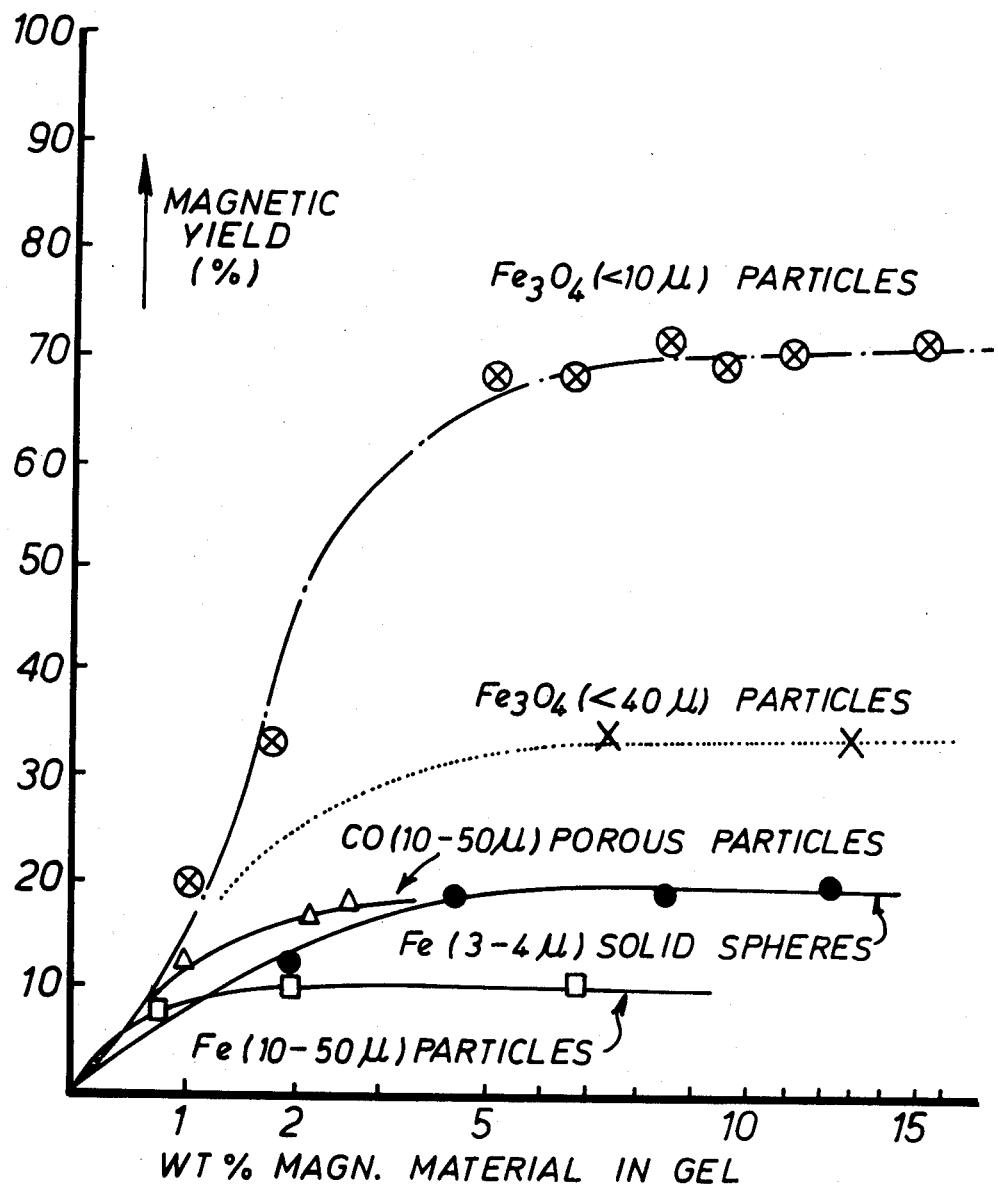

SEPARATION OF HYDROCARBONS USING MAGNETIZABLE ADSORBENTS

This is a division of application Ser. No. 623,728, filed June 22, 1984, now U.S. Pat. No. 4,617,282.

This invention relates to magnetizable adsorbent compositions, and particularly to magnetizable zeolite compositions useful in forming fluidized beds of magnetically stabilized particles.

It is known that a fluidized bed of magnetizable particulate solids can be subjected to a magnetic field and stabilized, and that such a bed is useful in processes requiring fluid-solid contact.

In magnetically stabilized bed processes, like conventional fluidized processes, a fluid is injected upwardly at velocities sufficient to overcome the free fall velocities of the individual particles (due to gravity) and cause bed expansion and fluidization of the particles without sweeping significant amounts of the particles from the bed. In conventional fluidized processes, however, the injection of fluid at velocity sufficient to produce expansion of the bed (i.e., transform the fixed packed bed to a fluidized bed) is accompanied by significant bubble formation whereas, in contrast, in a fluidized bed subjected to the influence of a magnetic field there is an interim, or quiescent state wherein there is little, if any, motion exhibited by the particles within the fluidized bed. Within the magnetically stabilized bed the formation of bubbles (with gas) or chaunds (with a liquid) is virtually eliminated and backmixing is suppressed allowing staging to be achieved. For this reason, magnetically stabilized bed processes offer advantages over both fixed and conventional fluidized bed operations. They are superior to conventional fluidized bed operations in that they provide better counter-current contacting, low fluid and solids back mixing, and lower particle attrition. They are superior to fixed bed operations in that they provide lower pressure drop, better ability to transfer solids, and virtually eliminate bed plugging problems. A process disclosing a magnetically stabilized bed and its mode of operation for conducting catalytic reactions, and the capture of particulates to provide a filtering action is disclosed in U.S. Pat. No. 4,115,927.

In much of the early work on catalytic processes the ferromagnetic component constituted essentially the whole of the particles in the bed. Compositions were also developed comprising ferromagnetic inclusions dispersed within matrices constituted in part of non-ferromagnetic materials and processes for the subjection of beds of such particles to the influence of a magnetic field are known.

U.S. Pat. No. 4,247,987 discloses forming a composite of a magnetizable component and adsorbent (e.g. zeolite) by admixing them with a base for the adsorbent (e.g. silica or alumina) to form a gel which is dried, calcined and sized. U.S. Pat. No. 4,252,679 discloses contacting a magnetic alloy of iron or cobalt with a phosphate ion containing solution to form a film thereon, then admixing with an inorganic oxide matrix, followed by contacting with a noble metal. The composite can be formed by cogellation of the magnetic alloy particles with an inorganic oxide support material (e.g. zeolite) preferably by admixture in a slurry with an inorganic oxide precursor which is precipitated from solution with the magnetic alloy particles. U.S. Pat. No. 4,255,289 discloses an inorganic oxide particulate admixed with magnetic alloy particles and an inorganic precursor which serves as a binder. U.S. Pat. No. 4,289,655 discloses a magnetic iron precursor (illmenite, $FeTiO_3$) incorporated within an inorganic oxide and heated in a reducing atmosphere to form reduced iron metal dispersed throughout the composite.

Zeolites are particularly useful in adsorption processes, and it has now been found that a highly effective adsorbent particle for use in magnetically stabilized fluidized beds may be prepared by forming a zeolite around a magnetizable core, preferably so that the zeolite substantially covers the core, and that the resulting particle has a number of advantages over conventional magnetizable composites containing zeolites.

GB Pat. No. 1,245,349 discloses extended zeolite structures (which are specifically defined to exclude discrete particles) comprising a support, a layer of alumina on the support and a layer of crystalline aluminosilicate zeolite on the layer of alumina. The support can have any configuration, apart from particles, and be formed of any material including metals, non-metals and alloys.

In one aspect this invention provides a process for the preparation of magnetizable zeolite composites, in which process discrete magnetizable particles are introduced into a reaction mixture for forming the zeolite such that zeolite is formed on the surface of the magnetizable particles.

The particular zeolite chosen will depend upon the adsorption or separation which it is to be carried out using the magnetically stabilized fluidized bed. For example, when it is desired to separate aromatic hydrocarbons, specifically of paraxylene or paraxylene and ethylbenzene from $C_8$ aromatic isomeric feedstreams (which may comprise principally ethylbenzene, paraxylene, orthoxylene, and metaxylene), this may be carried out by utilizing zeolites whose internal pore surfaces are accessible for selective combination of solid and solute. Examples of suitable zeolites include potassium substituted zeolite X or Y (synthetic forms of faujasite), barium substituted zeolite X or Y and rubidium substituted zeolite X. Potassium-substituted zeolite Y is particularly preferred.

The preparation of such zeolite adsorbent is well known—for example, potassium-substituted zeolite Y (for convenience referred to as "potassium-Y" or "K-Y") may be synthesized from Na, K-aluminosilicate gels or manufactured by a relatively simple ion exchange with a potassium salt carried out on commercially available sodium-Y-faujasite (Na-Y). Na-Y may in turn be prepared for example as described in U.S. Pat. Nos. 3,130,007, 4,178,352 and 4,175,059. For the preferred separation of aromatic hydrocarbons the faujasite preferably has a silica to alumina ratio ($SiO_2/Al_2O_3$) of less than about 5:1, and preferably about 3.8–4.9:1 (higher ratios are normally detrimental to the separation of paraxylene from other $C_8$ isomers). Potassium-Y-faujasite has been found to be an exceptional adsorbent for separating the xylene isomers; paraxylene being selectivly adsorbed in the presence of metalxylene, orthoxylene, and ethylbenzene. The observed order of sorbability for xylene isomers on potassium-Y-faujasite is paraxylene > ethylbenzene > metaxylene > orthoxylene.

Other adsorbent zeolites may be desirable where different molecules are to be adsorbed, and as used herein the term "zeolites" includes not only aluminosilicate forms, but also low aluminium or substantially aluminium-free silicates with a zeolite structure and analogues of aluminosilicates in which the tetrahedrally coordinated aluminium in the zeolite structure is replaced by one or more elements such as gallium, boron or iron. The preparation of individual zeolites may vary, but in general comprises preparation of a reaction mixture containing a source of silicon, a source of cations and, unless a substantially pure silica form is required, a source of modifying element (typically aluminium as described hereinbefore, but alternatively a source of an element such as boron, gallium or iron). This reaction mixture is then held under appropriate crystallization conditions until the desired zeolite is formed, which may thereafter be modified by subsequent chemical treatment such as ion exchange. The particular synthesis techniques to be employed, including the use of additonal template molecules, particular cations or anions, reaction temperatures and pressures are well documented for each known zeolite. The invention will be described in terms of zeolite Y but it is believed to be within the competence of one skilled in the art to adapt the technique to preparing magnetizable forms of other zeolites, e.g. zeolite A, L, mordenite, omega or ZSM-5.

In a preferred aspect of the invention there is provided a process for the preparation of magnetizable composites comprising zeolite Y, which process magnetizable particles are introduced into a reaction mixture for forming zeolite Y, the reaction mixture is heated to form zeolite Y and magnetizable particles having zeolite Y formed thereon are recovered.

As indicated hereinbefore, the preparation of Zeolite Y is well described in the literature, and it is believed to be within the competence of one skilled in the art to prepare zeolite Y. According to the invention the magnetizable particles are introduced into the reaction mixture for the zeolite Y, so that zeolite Y is formed therearound.

By way of illustration, preferred reaction mixtures comprise reactants in the following molar ratios (expressed in terms of oxides):

|  | Preferred | Highly Preferred | Example |
| --- | --- | --- | --- |
| $Na_2O/SiO_2 =$ | 0.4–0.6 | 0.45–0.48 | 0.46 |
| $SiO_2/Al_2O_3 =$ | 12–20 | 14–17 | 16 |
| $H_2O/Na_2O =$ | 12–48 | 20–30 | 25 |

The reaction mixture is preferably seeded with a slurry comprising 4 to 10 wt %, more preferably 6 to 8 wt. %, of the reaction mixture and having a composition in the following molar ratios:

|  | Preferred | Example |
| --- | --- | --- |
| $Na_2O/SiO_2 =$ | 0.8–1.3 | 1.08 |
| $SiO_2/Al_2O_3 =$ | 3–20 | 15 |
| $H_2O/Na_2O =$ | 5–45 | 20 |

According to the invention, magnetizable particles are introduced into the reaction mixture prior to the formation of zeolite Y. These magnetizable particles may be formed of a material which is magnetic in an externally applied magnetic field or magnetic per se, and are preferably formed of a ferromagnetic element or compound. These particles should:

(1) not inhibit zeolite Y formation;

(2) be stable under zeolite Y preparation conditions;

(3) preferably have a high saturation magnetization to minimise the amount of magnetizable material in the adsorbent. (This criterion could also be met by chemical and/or physical treatment to increase the saturation magnetization of the magnetizable particles—e.g. by chemical reduction to a more highly magnetizable form);

(4) preferably have a high Curie temperature so that the adsorbent may be used in high temperature process;

(5) preferably have a similar thermal expansion behaviour to zeolite Y.

Preferred materials are ferromagnetic metals such as iron, cobalt and their alloys such as steels, and ferromagnetic compounds such as magnetite ($Fe_3O_4$). The magnetizable particles are discrete particles as opposed to the extended supports described in GB No. 1,245,349, which latter supports would not be suitable for forming particles for use in a magnetically stabilized bed, since for example the surface area of adsorbent would be too low. The magnetizable particles used in the invention typically have a maximum particle size of 500 μm. The particles preferably have a mean size of at least 2 nm more preferably from 10 nm to 200 μm, most preferably from 2 to 50 μm.

The invention does not require that the magnetizable particles are subjected to any pretreatment or preliminary coating prior to the formation of the zeolite thereon.

The magnetizable particles are preferably added in an amount of from 0.5 to 90 wt % of the combined weight of reaction mixture plus magnetizable particles, more preferably from 1 to 20 wt % of that combined weight, most preferably 1 to 10 wt %.

The magnetizable particles are added so that zeolite Y is formed thereon, and it has been found advantageous for the magnetizable particles to be introduced prior to initiating crystallization by heating the reaction mixture.

On heating the reaction mixture containing the magnetizable particles to an appropriate zeolite Y-forming temperature for an appropriate time zeolite Y is formed on the magnetizable particles resulting in the formation of magnetizable zeolite composites. A wide range of crystallization temperatures and times may be used but, preferably the reaction mixture is heated to from 60 to 120° C. for from 7 to 20 hours.

Following formation of the magnetizable adsorbent particles they may be treated to enhance their adsorption properties. In particular, a preferred product will comprise in whole or in the major part Na-Y which may be ion exchanged with a solution of a potassium salt, preferably potassium chloride, to give the correspond K-Y product.

The invention extends to magnetizable zeolite particles, for use in a magneticaly stabilized bed comprising a core of a ferromagnetic particle having a zeolite formed therearound, preferably as described herein.

The invention also extends to a method of separating aromatic hydrocarbons using a magnetically stabilised fluidised bed of adsorbent particles, in which the particles are prepared by the process of the invention.

The process preferably involves providing a bed of magnetizable adsorbent particles which are fluidized by the flow of liquid through the bed; applying a magnetic field to the bed to stabilize the orientation of the bed; adsorbing components of a liquid feedstream of hydrocarbons by passing the feedstream through the bed; and desorbing the adsorbed components with a desorbent. Efficiency of separation of the hydrocarbon components is increased by the use of adsorbent particles which pass through a 40 mesh screen, US Standard, while being able to maintain high liquid velocity (throughput) but without the high pressure drops which hampered previous fixed bed processes.

Once the hydrocarbon component of the feedstock is adsorbed onto the particular adsorbent material, it is removed by the use of a selected desorbent. This desorbent is a material which is capable of displacing the sorbate components of the feedstock material. The desorbent selected may be diluted to obtain the desired strength relative to the hydrocarbon being separated. If the diluent is not adsorbed, then the combined desorbent plus diluent stream is most precisely described as eluent. However, as many nominal diluents may themselves actually serve as extremely weak descorbents, for the purposes of the present invention the combined stream will be referred to as desorbent. For example, the desorbent used in the separation of xylene isomers may be a mixture of toluene and carrier, such as $C_{10}$ to $C_{14}$ linear paraffins; toluene acts by competing with the xylene isomers (or other feed components) for the active sites. Among the suitable desorbents, and particularly useful in the separation of isomeric $C_8$ aromatic hydrocarbons, are toluene, m-diisopropylbenzene, p-diethylbenzene, mixtures of diethylbenzene isomers, o-dichlorobenzene, and the like. This list, of course, is not all encompassing; other desorbents may be selected provided that they are capable of displacing the sorbent components of the feedstock material.

The use of the zeolite composites of the invention in such processes as the adsorbent is advantageous since the composites of the invention provide smaller adsorbent particles than obtained by conventional methods which act as efficient adsorbents and may in a magnetically stabilised bed be used without the pressure drop problems normally associated with small particles. Moreover, the composites of the invention by having the zeolite material as a relatively thin layer over magnetizable particles avoid the drawback of conventional adsorbents where much of the zeolite is trapped within large agglomerate where its adsorbent properties are not utilised.

BRIEF DESCRIPTION OF DRAWINGS

The following Examples are now given, though only by way of illustration, to show certain aspects of the invention in more detail, with reference to the accompanying drawings, in which:

FIG. 1 is a graph of magnetic yield of the product against time of addition of iron particles to the reaction mixture in a process of the invention; and FIG. 2 is a graph of magnetic yield of product against amount of magnetizable particles added to the reaction mixture in a process of the invention.

Test Methods: Measurement of Magnetic Yield

To evaluate the products of the process of the invention, test methods were developed to determine the percentage of the adsorbent (zeolite Y) synthesized that was made magnetizable—i.e. that is, the zeolite Y adhering to the magnetizable core particle.

The magnetic yield is defined as:

Magnetic yield =

$$\frac{(\text{wt magnetizable fraction}) - (\text{wt metal in sample})}{(\text{wt total sample}) - (\text{wt metal in sample})} \times 100\%$$

To determine this magnetic yield, it was necessary to be able to separate magnetic and non-magnetic fraction of the products. This was carried out as follows.

Procedure:

1 gram of carefully crushed sample and 20 ml acetone were added to a 20 ml sample-tube. The tube was closed and shaken, then a composite of three magnets (Tamson-Alnico N 4005) was place on the bottom of the tube which was subjected to a second shaking. The magnetic particles were attracted by the magnet. The liquid and non-magnetic particles were decanted off.

The same procedure was repeated a second time. Only a minor amount of further non-magnetic particles were removed in the second treatment. Acetone which remained in the tube was soaked up with a dry paper tissue and finally the sample-tube was loosely covered with aluminium foil and dried for 1 hour at 100° C. After cooling for 10-15 minutes at room temperature the magnetic residue was weighed. The magnetic yield was then calculated as described above.

EXAMPLES 1-9

Preparation of Magnetizable Zeolite Y

In Examples 1 and 4-6 the following technique was used: A mixture of 118.92 g Ludox HS-40 and 42.96 g water was added within 20 secs to a well-stirred solution of (7.61 g alumina trihydrate and 28.84 g sodium hydroxide in 37.50 g water. The resulting thick gel was homogenized thoroughly over 2-3 min. Subsequently, 15 ml of a slurry of amorphous nucleation centres (slurry-composition:$18.3Na_2O/Al_2O_3/17.3SiO_2/370.3H_2O$) was added and stirring was continued for another 1-2 min. Finally, the requisite amount of magnetizable particles was blended into the gel. The entire mixture was mechanically stirred (100 rpm) in a polypropylene bottle at 102° C. for 18 hours.

In Examples 2,3 and 7-9 the following technique was used: A mixture of 119.04 g Ludox HS-40 and 42.88 g water was added within 30 secs to a well-stirred solution of 7.61 g alumina trihydrate and 28.88 g sodium hydroxide in 37.50 g water. The resulting thick gel was homogenized thoroughly over 1-2 min. Subsequently, 15 ml of a slurry of amorphous nucleation centres (slurry-composition:$16.0Na_2O/Al_2O_3/15.0SiO_2/320.H_2O$) was added and stirring was continued for another 1-2 min. Finally, the requisite amount of magnetizable particles was blended into the gel. The entire mixture was mechanically stirred (50-100 rpm) in a polypropylene bottle at 98° C. for 18 hours.

The product was of each Example was analysed by scanning electron microscopy and found to comprise magnetizable particles coated with zeolite Y. The magnetic yield of the products of various preparations using various magnetizable particles were determined and the results are given in Table 1 below.

To provide a comparison, simple mixtures of zeolite Y and magnetizable particles were prepared by the following techniques.

Dry Mixing—technique "A"

Preparation of a blend of zeolite Y and magnetizable particles was effected by mixing the requisite amounts of zeolite Y and magnetizable particles in a closed sample tube.

Wet Mixing—technique "B"

Preparation of a blend of faujasite and metal particles was effected by mixing the requisite amounts of zeolite Y and magnetizable particles with a large excess of demineralized water in a PTFE centrifuge tube. Subsequently, the mixtures was centrifuged at 3800 rpm for 10 min. The solid residue was dried overnight (16–20 hours) at 150° C. and crushed with a mortar and pestle.

TABLE 1

| | Magnetizable particle | | Product | | | |
|---|---|---|---|---|---|---|
| | | size ($\mu$) | wt % in gel | wt % in product | magnetic yield | $SiO_2/Al_2O_3$ | zeolite Y[1] yield (%) |
| Example | | | | | | | |
| 1 | iron | 3–4 | 1.8 | 22 | 18 | 4.1 | 7.5 |
| 2 | iron | 3–4 | 12.3 | 60 | 18 | nm[2] | 8.9 |
| 3 | iron | 10–50 | | 17 | 9 | nm | 8.7 |
| 4 | cobalt | 10–50 | 1.8 | 19 | 14 | 3.9 | 8.0 |
| 5 | cobalt | 10–50 | 0.8 | 9 | 12 | nm | 8.0 |
| 6 | cobalt | 10–50 | 2.3 | 23 | 16 | nm | 7.9 |
| 7 | cobalt | 5–10 | 5.8 | 42 | 5 | nm | 8.5 |
| 8 | magnetite ($Fe_3O_4$) | <10 | 5.7 | 39 | 70 | 4.0 | 9.6 |
| 9 | magnetite | <40 | 5.5 | 42 | 33 | nm | 8.8 |
| Comparative Examples* | | | | | | | |
| 1A | iron | 3–4 | | 20 | 0 | | |
| 1B | iron | 3–4 | | 20 | 0 | | |
| 2A | cobalt | 10–50 | | 20 | 0 | | |
| 2B | cobalt | 10–50 | | 20 | 6 | | |

*"A" indicates technique A was used to prepare the mixture
"B" indicates technique B was used to prepare the mixture
[1] yield = Y product wt./total gel wt. × 100%
[2] nm. = not measured

EXAMPLE 10

Effect of Timing of addition of magnetizable particles

The procedure of Example 1 was repeated, in a number of further preparations in which the time of addition of the iron particles was varied. In one case the iron particles were added ½ hour prior to the reaction mixture being heated to crystallisation conditions, in other cases the addition of iron particles was delayed until after crystallisation had commenced. The results are shown in FIG. 1, which indicates the magnetic yields of the products obtained at various times of addition of the iron particles. It may be seen that the best results are obtained when the magnetic material is added at or before crystallisation is initiated.

EXAMPLE 11

Effect of amount of magnetizable particles on magnetic yield

FIG. 2 is a graph showing the effect on magnetic yield of the amount of magnetizable particles added to the reaction mixture prior to crystallisation, for a variety of types of magnetizable particle. It is observed that the magnetic yield increases with increasing amounts of magnetizable particles up to amounts of magnetizable particles corresponding to 4–5 wt % of the gel, then little further increase is seen.

EXAMPLES 12–18 and COMPARATIVE EXAMPLES 3–6

Growth of zeolites on colloidal ferromagnetic particles

Magnetizable zeolite composites of the invention were prepared by crystallizing various zeolite types around colloidal magnetite particles having a particle size of approximately 10 nm in colloidal solution in the presence of a surfactant These colloidal solutions are known as "magnetic fluids" or "ferro-fluids".

A crystallization gel for preparing the zeolite in the conventional manner was prepared with less water than normal, and to this was added the magnetic fluud in an amount to make up the volume and ensure uniform mixture The gel and magnetic fluid were mixed mechanically using a Teflon-coated blade The uniformly mixed gel was then aged and crystallized in the normal way. To provide a comparison, zeolite syntheses were conducted using the same gel compositions, but without the addition of the magnetic fluid After crystallization the products were filtered, washed and dried.

As shown in Table 2 below zeolites A, X and Y were prepared by this procedure using two different magnetic fluids: one having an aliphatic acid surfactant and one having an amine surfactant. The products obtained by the synthesis according to the invention generally resulted in larger particles and electron microscopy indicated that the particles comprised zeolite formed around a core of the magnetic particles of the magnetic fluid.

TABLE 2

| Example | Zeolite type | Gel Composition $SiO_2:Al_2O_3:Na_2O:H_2O$ | Magnetic fluid surfactant | vol % | Reaction | Product |
|---|---|---|---|---|---|---|
| 12 | A | 2.02:1:3.6:166 | aliphatic acid | 25 | 12 hrs/80° C. | 5$\mu$ rounded cubes |
| 13 | A | 2.02:1:3.6:166 | amine | 25 | 12 hrs/80° C. | 3$\mu$ cubes |
| Comp. 3 | A | 2.02:1:3.6:166 | — | — | 4 hrs/80° C. | 2$\mu$ cubes |
| 14 | X | 3.68:1:4.92:350 | aliphatic acid | 25 | 66 hrs/80° C. | 5$\mu$ octahedra |
| Comp. 4 | X | 3.68:1:4.92:350 | — | — | 66 hrs/80° C.* | 4$\mu$ octahedra |
| 15 | Y | 20:1:8.66:7.88 | aliphatic acid | 30 | 220 hrs/80° C. | <2$\mu$ Si:Al = 3.9 |

TABLE 2-continued

| Example | Zeolite type | Gel Composition $SiO_2:Al_2O_3:Na_2O:H_2O$ | Magnetic fluid surfactant | vol % | Reaction | Product |
|---|---|---|---|---|---|---|
| 16 | Y | 20:1:8.66:788 | aliphatic acid | 15 | 137 hrs/80° C. | <2µ |
| 17 | Y | 20:1:8.66:788 | amine | 15 | 137 hrs/80° C. | <2µ Si:Al = 3.4 |
| Comp. 5 | Y | 20:1:8.66:788 | — | — | 94 hrs/80° C. | <2µ |
| 18 | Y | 16:1:7.33:800 | aliphatic acid | 27 | 215 hrs/80° C. | 1–2µ octahedra |
| Comp. 6 | Y | 16:1:7.33:800 | — | — | 96 hrs/80° C. | 1µ octahedra |

*settling at 40 hours

We claim:

1. A method of separating a hydrocarbon component from a fluid feedstream containing mixed hydrocarbon components comprising:
   (a) providing a bed of magnetizable adsorbent zeolite composite particles which are fluidized by a flow of fluid therethrough under fluidizing conditions, said particles being capable of selectively adsorbing said hydrocarbon component from said feedstream;
   (b) applying a magnetic field to the bed at a strength sufficient to suppress solids backmixing;
   (c) adsorving at least a portion of said hydrocarbon component from said feedstream by passing the feedstream through the bed; and
   (d) desorbing said hydrocarbon component from said bed,
said magnetizable adsorbent zeolite composite particles having been prepared according to a process which comprises introducing discrete magnetizable particles having a maximum particle size of 500 µm into a reaction mixture for forming the zeolite prior to initiating crystallization and thereafter heating the resulting reaction mixture to the crystallization temperature in a manner and under conditions sufficient to cause the zeolite to crystallize on the surface of the magnetizable particles.

2. The method of claim 1, wherein in the process for preparing said magnetizable adsorbent zeolite composite particles, the zeolite used is zeolite Y.

3. The method of claim 2, wherein in the process for preparing said magnetizable adsorbent zeolite composite particles, the reaction mixture comprises reactants in the following molar ratios, expressed in terms of oxides:

| | |
|---|---|
| $Na_2O/SiO_2$ = | 0.4–0.6 |
| $SiO_2/Al_2O_3$ = | 12–20 |
| $H_2O/Na_2O$ = | 12–48 |

4. The method of claim 3, wherein in the process for preparing said magnetizable adsorbent zeolite composite particles, the reaction mixture comprises reactants in the following molar ratios, expressed in terms of oxides:

| | |
|---|---|
| $Na_2O/SiO_2$ = | 0.45–0.48 |
| $SiO_2/Al_2O_3$ = | 14–17 |
| $H_2O/Na_2O$ = | 20–30 |

5. The method of claim 2, wherein in the process for preparing said magnetizable adsorbent zeolite composite particles, the reaction mixture is seeded with a slurry comprising 4–10 wt % of the reaction mixture and having a composition in the following molar ratios:

| | |
|---|---|
| $Na_2O/SiO_2$ = | 0.8–13 |
| $SiO_2/Al_2O_3$ = | 3–20 |
| $H_2O/Na_2O$ = | 5–45 |

6. The method of claim 1, wherein in the process for preparing said magnetizable adsorbent zeolite composite particles, the magnetizable particles are particles of iron, cobalt, steel or magnetite.

7. The method of claim 1, wherein the magnetizable adsorbent zeolite composite particles have a mean diameter of from 2 µm to 500 µm.

8. The method of claim 1, wherein in the process for preparing said magnetizable adsorbent zeolite composite Particles, the reaction mixture contains from 0.5–90 wt % of magnetizable particles.

9. The method of claim 1, wherein in the process for preparing said magnetizable adsorbent zeolite composite particles, said formed particles comprise the sodium form of zeolite Y which is thereafter ion exchanged with a solution of a potassium salt to form the corresponding potassium form of zeolite Y.

10. The method of claim 1, wherein said magnetizable adsorbent zeolite composite particles comprise a magnetizable particle as a core having zeolite formed thereon.

11. The method of claim 10, wherein said magnetizable adsorbent zeolite composite particles comprise substantially covers the magnetizable core.

12. The method of claim 1, wherein the magnetizable adsorbent zeolite composite particles comprise from 0.5 to 90 wt % magnetizable core.